Sept. 25, 1951     A. DEWANDRE     2,568,723

RELAY VALVE FOR COMPRESSED FLUIDS

Filed April 17, 1946

Inventor
A. Dewandre

Patented Sept. 25, 1951

2,568,723

UNITED STATES PATENT OFFICE 2,568,723

RELAY VALVE FOR COMPRESSED FLUIDS

Albert Dewandre, Brussels, Belgium

Application April 17, 1946, Serial No. 662,902
In Belgium February 17, 1943

Section 1, Public Law 690, August 8, 1946
Patent expires February 17, 1963

5 Claims. (Cl. 303—32)

My invention concerns distributors for compressed fluid and especially a relay valve for the automatic braking of trailers.

In non-automatic installations for braking trailers by compressed fluid, it is the general custom to have a control valve for the direct control of the fluid pressure in the brake cylinders of the trailer. Nevertheless, when such a control valve is used for the control of brakes in installations for automatic braking of trailers, it is necessary to add to the installation a relay valve controlled by the control valve in order to regulate the drop in pressure of the fluid in the pipe system of the installation.

There are already such relay valves in which an arrangement of pistons controlling the valves is pushed against the resistance of a drag spring under the pressure of the distributed fluid. These relay valves have however the disadvantage of having to work with a minimum pressure of the fluid and lack sensitivity in the case of accidental diminution of the pressure in the installation.

The present invention has as its object the obviation of such inconveniences.

According to the invention, an elastic means of resistance is opposed to any movement of the pistons controlling the valves of the relay valve and offer a resistance which varies automatically according to the pressure in the reservoir or in the source of the fluid of the installation.

Two forms of the invention will be described hereinafter with reference to the accompanying drawing, in which.

Figure 1:
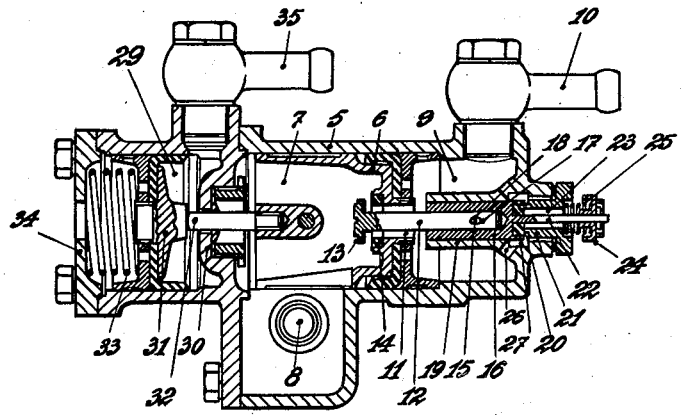
Figure 1 is a sectional view through the centre of the mechanism of a first form of relay valve.

In the form shown in Figure 1 the relay valve consists of a body 5, in the bore of which works a piston 6 forming on one side a chamber 7 in communication through a pipe 8 with the reservoir or the source of the fluid and on the other hand, a chamber 9 in communication with the pipe system 10 of the installation.

In piston 6 there is provided an axial opening 11 through which passes the spindle 12 of normally open valve 13 which works in conjunction with the seat 14 formed around the rim of the opening 11. Spindle 12 works in a bore 15 formed in the centre of a normally closed valve 16 and is limited in its movements by a lost motion link constituted by an oblong hole 17 in the spindle and a pin 18 fixed in valve 16. This last valve fits into a central boss 19 provided in the body 5 and works in conjunction with a seat 20 formed on a socket 21 screwed into the body 5. Valve 16 has a spindle 22 which extends into the opening 23 of socket 21 and which carries at its extremity a cap 24 in which fits a spring 25 butting against the socket 21. The opening of valve 16 permits communication between chamber 9 and the atmosphere through passages 26, recess 27 and the space 23 of socket 21.

Figure 2:
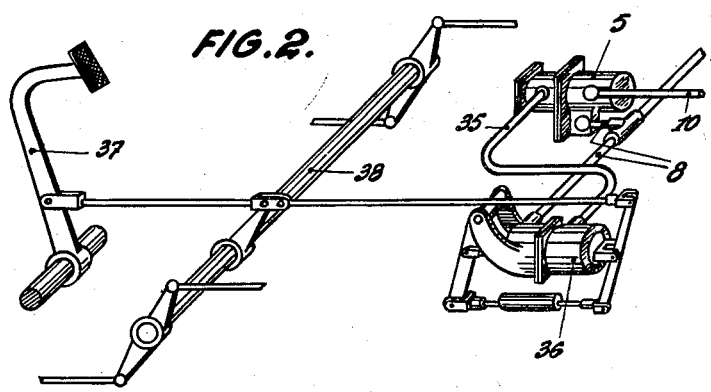
Figure 2 is an arrangement view showing the combination of the relay valve and the control valve in an automatic installation for braking trailers.

Inside a chamber 29, concentric with chamber 7 and separated hermetically from it by a wall 30 works a piston 31 connected to piston 6 by means of a spindle 32 which moves in a manner which ensures its tightness through the said wall 30. A return spring 33 is provided between the said piston 31 and the cover 34 of chamber 29. A pipe connection 35 puts this latter chamber in communication with the conventional control valve 36 (Figure 2) on the installation which is worked by pedal 37 of rod mechanism 38 controlling the tractor brakes.

The working of the relay valve is as follows:

In the normal position of the parts of the arrangement: pistons 31 and 6 are forced to the right under the action of return spring 33 whilst valve 16 is shut and valve 13 open, putting chambers 7 and 9 into communication. Since chamber 7 is in constant communication with the source or the reservoir of the fluid, maximum fluid pressure prevails in the said chambers 7 and 9 and as a consequence in the pipe system 10. Piston 6 is thus in a position of equilibrium.

If now pedal 37 of the rod mechanism 38 is manipulated for braking purposes, control is exercised simultaneously on the control valve 36 and air under pressure is delivered from this latter and enters chamber 29 and acts on piston 31, which, under the action of the compressed fluid, moves toward the left carrying with it piston 6. The effect of this movement is to close valve 13, isolating chamber 7, and to open valve 16, thus permitting the air in chamber 9 and in the pipe system 10 to escape into the atmosphere, through passages 26, recess 27 and hollow space 23. The amount of air which thus escapes is proportional to the compressed air admitted to chamber 29.

The drop in the pressure in chamber 9 is compensated by the pressure admitted into chamber 29, and the pistons and valves can reassume at any moment equilibrium on the one hand through the pressure of the air in chamber 7, a pressure which remains constant, and, on the other hand, through the sum of the pressures acting toward the left on pistons 6 and 31 respectively in chambers 9 and 29.

If, in the opposite sense, pedal 37 is released with a reduction of suppression in chamber 29 of pressure delivered by the control valve 36, a reverse movement of the parts will take place in the relay valve, with an increase in pressure in chamber 9 and the pipe system 10 and a corresponding releasing of the trailer brakes.

Figure 3:
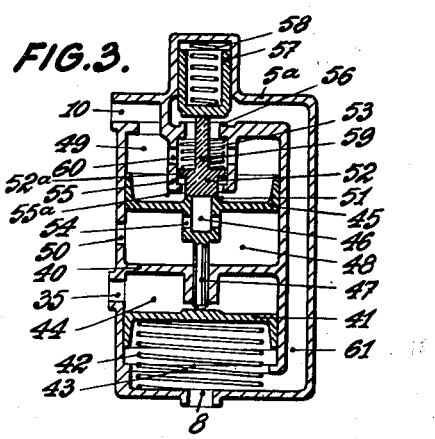
Figure 3 shows in section a second form of relay valve.
Figure 4:
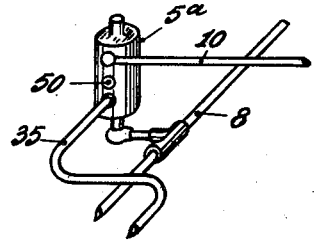
Figure 4 is an arrangement showing the connections between valve Figure 3 and the piping of the installation.

In the alternative arrangement of Figure 3, the relay valve comprises a body 5a consisting of two compartments separated by a partition 40. In the lower compartment a piston 41 works under the pressure of a return spring 42 and forms on its two opposite faces chambers 43 and 44, which communicate, the first through pipe 8, with the fluid or reservoir of the installation, and the second, through pipe 35, with the control valve 36 of the installation.

In the top compartment a second piston 45 works having at its centre an opening 46 from which extends downwards a spindle 47 which passes through, in a manner which ensures its air-tightness, the partition 40, and rests at its lower end on the piston 41.

Piston 45 forms, in the upper compartment of the valve, two chambers 48 and 49, the first of which opens to the atmosphere through aperture 50 and the second into pipe system 10 of the installation.

The rim of aperture 46 of the piston 45 forms a seating 51 for a valve 52, under the action of a spring 53 and this valve 52 normally rests on the said seat in order to prevent communication between the chambers 48 and 49, this communication being established through opening 46 and passages 54.

Valve 52 is guided in a central cylinder 55, part of the valve body 5a, and having a collar 56 forming the seating for a valve 57, suitably guided in a bore formed by an extension of cylinder 55 and under the action of spring 58.

Valve 57 is normally held off its seat by spindle 59 of valve 52 to allow communication, through passages 60, between chamber 49 and passage 61, which is formed in the valve body 5a and extends as far as chamber 43, which is in communication with the source of the fluid.

The working of this alternative construction of relay valve is as follows:

In normal working pistons 41 and 45 are in a state of equilibrium under the action of the pressure prevailing in chambers 43 and 49, whilst chambers 44 and 48 are at atmospheric pressure.

When the air under pressure, delivered by the control valve 36, enters through pipe 35 into chamber 44 the aforesaid equilibrum is broken and piston 41 is forced downwards (looking at Figure 3) against the pressure in chamber 43 and the resistance of the spring 42.

Under the action of the pressure existing in chamber 49, piston 45 which rests upon piston 41, is set in movement together with this latter, allowing in succession the closing of valve 57 and the opening of valve 52, the movement of this latter being limited due to the collars 52a and 55a. Chamber 49 is thus isolated from passage 61 and put into communication with the atmosphere through the aperture 36, passages 54, chamber 48 and the opening 50. The amount of air which thus escapes is proportional to the compressed air admitted to chamber 44.

As in the relay valve described in the first place, the drop in pressure in chamber 49 is compensated by the pressure admitted into chamber 44, and the system, pistons and valves can be put in equilibrium on the one hand as a result of the air pressure in chamber 43, which remains constant, and on the other hand by the sum of the pressures acting on pistons 41 and 45 respectively in chambers 44 and 49.

What I claim is:

1. A relay valve device comprising a casing divided into two compartments, a first pressure responsive movable member in one of said compartments dividing the same into two chambers, one of which is connected to the device to be controlled and the other of which is in constant communication with a source of relatively high pressure, a normally open valve element actuated by movement of said pressure responsive member and arranged to control communication of said one chamber with said other chamber, a normally closed valve element arranged to control communication of said one chamber with a source of relatively low pressure, a direct connection between said valve elements, and a second pressure responsive movable member in the other compartment of the casing dividing said compartment into two chambers, one of which is connected to the control line, said first and second pressure responsive movable members being mechanically interconnected.

2. A relay valve device comprising a casing divided into two compartments, a first pressure responsive movable member in one of said compartments, dividing the same into two chambers, one of which is connected to the device to be controlled and the other of which is in constant communication with a source of relatively high pressure, a normally open valve element at one side of said one chamber actuated by movement of said pressure responsive member and arranged to control communication of said one chamber with said other chamber, a normally closed valve element at the opposite side of said one chamber arranged to control communication of said one chamber with a source of relatively low pressure, a direct connection between said valve elements, and a second pressure responsive movable member in the other compartment of the casing dividing said compartment into two chambers, one of which is connected to the control line, said first and second pressure responsive movable members being mechanically interconnected.

3. A relay valve device comprising a casing divided into two compartments, a first pressure responsive movable member in one of said compartments dividing the same into two chambers, one of which is connected to the device to be controlled and the other of which is in constant communication with a source of relatively high pressure, a normally open valve element at one side of said one chamber actuated by movement of said pressure responsive member and arranged to control communication of said one chamber with said other chamber, a normally closed valve element at the opposite side of said one chamber arranged to control communication of said one chamber with a source of relatively low pressure, a direct connection between said valve elements, said connection incorporating a lost-motion link, and a second pressure responsive movable member in the other compartment of the casing dividing said compartment into two chambers, one of which is connected to the control line, said first and second pressure responsive movable members being mechanically interconnected.

4. A relay valve device comprising a casing divided into two compartments, a first pressure responsive movable member in one of said compartments dividing the same into two chambers which are in communication when said first pressure responsive movable member is in released position, one of said chambers being connected to the device to be controlled, and the other of which is constantly connected to a source of relatively high pressure, said pressure responsive movable member having an axial opening therein, a normally open valve element actuated by movement of said pressure responsive member and arranged to control said opening, a normally closed valve element arranged to control communication of said chamber with a source of relatively low pressure, a direct connection between said valve elements, and a second pressure responsive movable member in the other compartment of the casing dividing said compartment into two chambers, one of which is connected to the control line, said first and second pressure responsive movable members being mechanically interconnected.

5. A relay valve device comprising a casing divided into two compartments, a first pressure responsive movable member in one of said compartments dividing the same into two chambers which are in communication when said first pressure responsive movable member is in released position, one of said chambers being connected to the device to be controlled, and the other of which is constantly connected to a source of relatively high pressure, said pressure responsive movable member having an axial opening therein, a normally open valve element actuated by movement of said pressure responsive member and arranged to control said opening, a normally closed valve element arranged to control communication of said chamber with a source of relatively low pressure, a direct connection between said valve elements, and a second pressure responsive movable member in the other compartment of the casing dividing said compartment into two chambers, one of which is connected to the control line, and the other of which is connected to the low pressure source, said first and second pressure responsive movable members being mechanically interconnected.

ALBERT DEWANDRE.

REFERENCES CITED

The following references are of record in the file of this patent:

UNITED STATES PATENTS

| Number | Name | Date |
| --- | --- | --- |
| 768,537 | McElroy | Aug. 23, 1904 |
| 785,537 | Barry | Mar. 21, 1905 |
| 811,765 | Corey | Feb. 6, 1906 |
| 912,973 | Murphy | Feb. 16, 1909 |
| 1,791,901 | McIntyre | Feb. 10, 1931 |

FOREIGN PATENTS

| Number | Country | Date |
| --- | --- | --- |
| 385,163 | Great Britain | Dec. 22, 1932 |